United States Patent
Buenaga et al.

(10) Patent No.: US 12,013,126 B2
(45) Date of Patent: Jun. 18, 2024

(54) ADJUSTABLE MOUNTING SYSTEM FOR A CONTROL PANEL OF A HOME COOKING APPLIANCE

(71) Applicants: BSH Home Appliances Corporation, Irvine, CA (US); BSH Hausgeräte GmbH, Munich (DE)

(72) Inventors: Hector Buenaga, New Bern, NC (US); Daniel Hausner, Bretten (DE); Michael Petrino, Rockport, MA (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 0 days.

(21) Appl. No.: 17/965,831

(22) Filed: Oct. 14, 2022

(65) Prior Publication Data
US 2024/0125482 A1  Apr. 18, 2024

(51) Int. Cl.
*F24C 15/08* (2006.01)
*F16B 3/06* (2006.01)

(52) U.S. Cl.
CPC ............ *F24C 15/08* (2013.01); *F16B 3/06* (2013.01)

(58) Field of Classification Search
CPC .......... F24C 15/08; F24C 3/124; F24C 7/082; F16B 3/06
USPC ...................................................... 248/231.9
See application file for complete search history.

(56) References Cited

U.S. PATENT DOCUMENTS

| | | | | |
|---|---|---|---|---|
| 3,556,624 A | * | 1/1971 | Baltz et al. | F24C 3/124 126/42 |
| 10,376,098 B2 | * | 8/2019 | Chun | F28F 9/0226 |
| 10,852,000 B2 | | 12/2020 | Heo | |
| 2014/0191639 A1 | * | 7/2014 | Freeman | F24C 3/126 312/352 |
| 2015/0192303 A1 | * | 7/2015 | Je | F24C 7/082 403/322.4 |
| 2016/0187000 A1 | * | 6/2016 | Jang | F24C 7/083 126/39 B |
| 2017/0059183 A1 | * | 3/2017 | Chun | F28F 9/165 |
| 2018/0094819 A1 | * | 4/2018 | Heo | F24C 15/06 |

FOREIGN PATENT DOCUMENTS

| | | |
|---|---|---|
| DE | 19649047 A1 | 5/1998 |
| EP | 1160513 A2 | 12/2001 |
| KR | 100395944 B1 | 8/2003 |

* cited by examiner

*Primary Examiner* — Muhammad Ijaz
(74) *Attorney, Agent, or Firm* — Michael B. Tschupp; Andre Pallapies; Brandon G. Braun

(57) ABSTRACT

An adjustable mounting system for mounting a control panel on a housing of a home cooking appliance, and a home cooking appliance having an adjustable mounting system, are provided. The adjustable mounting system includes a control panel having a mounting pin extending from a rear surface of the control panel and a mounting box fixed on the housing. The mounting box has a first opening that receives the mounting pin into an interior of the mounting box. The adjustable mounting system includes a locking device that engages the mounting pin and the mounting box and secures the mounting pin in the interior of the mounting box, which secures the control panel to the housing. A movement of the locking device with respect to the mounting box adjusts a position of the control panel with respect to the housing.

16 Claims, 10 Drawing Sheets

ADJUSTABLE MOUNTING SYSTEM FOR A CONTROL PANEL OF A HOME COOKING APPLIANCE

FIELD OF THE INVENTION

The present invention is directed to an adjustable mounting system for a control panel of a home cooking appliance, and more particularly, to an adjustable mounting system for a control panel of a home cooking appliance that is concealed from view and can control a gap between the control panel and the housing of the appliance.

BACKGROUND OF THE INVENTION

A home cooking appliance, such as a freestanding range, may include a control panel for controlling operation of various components and cooking functions. The control panel may include a plurality of control knobs for controlling the functions and operations of components of the appliance, such as gas burners on a cooktop, heating elements in an oven, etc.

SUMMARY OF THE INVENTION

The present invention recognizes that the control panel commonly is visible to the user at all times, and as a result, greatly contributes to the aesthetic appearance of the appliance. It is therefore desirable to mount the control panel to the housing of a home cooking appliance in a manner in which the mounting hardware and assembly are barely visible to a user or concealed entirely from view by the user. However, the present invention further recognizes that providing a control panel with mounting hardware that is concealed from view may increase a difficulty of mounting the control panel with the appliance during an assembly process in the manufacturing facility and may affect access for installation of other components, assemblies, or systems of the appliance during the manufacturing process. The present invention further recognizes that providing a control panel with mounting hardware that is concealed from view also may increase a difficulty of servicing various components of the appliance, for example, during testing or certification of the appliance, servicing/repairing various components of the appliance throughout the lifespan of the appliance, etc. As a result, the present invention recognizes that such increased difficulties associated with the assembly, testing, and servicing processes may lead to undesirable gaps between one or more parts of the control panel and other adjacent components of the appliance.

Moreover, the present invention recognizes that, as both a functional component and a highly visible, aesthetic component of the appliance, the control panel may be constructed separately from other components of the appliance, which may be adjacent to or abut the control panel, may be constructed of a different material and/or using different manufacturing techniques than other components of the appliance, and/or may be coupled to the appliance at different times during the manufacturing process than other components of the appliance. As a result, the present invention recognizes that differences in part tolerances associated with the control panel and other components also may lead to undesirable gaps between one or more parts of the control panel and other adjacent components of the appliance.

These problems and others are addressed by the present invention, a first exemplary embodiment of which comprises an adjustable mounting system for mounting a control panel on a housing of a home cooking appliance, the adjustable mounting system including a control panel having a mounting pin extending from a rear surface of the control panel, a mounting box configured to be fixed on the housing, the mounting box including a first opening configured to receive a part of the mounting pin into an interior of the mounting box, a locking device configured to engage the part of the mounting pin and a part of the mounting box and secure the mounting pin in the interior of the mounting box, thereby securing the control panel to the housing, wherein a movement of the locking device with respect to the mounting box adjusts a position of the control panel with respect to the housing. The mounting pin, the mounting box, and the locking device can be concealed from view when the control panel is mounted on the housing.

In this way, the present invention can provide a control panel having an adjustable mounting system that is not only concealed from view by a user, but also can provide improved control over the positioning and alignment of the control panel with other components of the housing of the appliance. Particularly, the present invention can provide control over a gap between the control panel and other components of the housing of the appliance, and more particularly, can minimize or eliminate such a gap between the control panel and other components of the housing of the appliance, and even more particularly, can minimize or eliminate a first gap between a rear edge of an upper surface of the control panel and a front edge of the cooktop of the appliance and a second gap between an edge of the sidewall of the control panel and a sidewall of the housing of the appliance.

In an example, the movement of the locking device with respect to the mounting box can draw the mounting pin in a direction of engagement of the mounting pin with respect to the mounting box to adjust the position of the mounting pin with respect to the mounting box.

In an example, the rear surface of the control panel can include an opening, and the mounting pin can include a threaded portion engaging the opening of the control panel. In still other examples, the mounting pin can be integrally formed on the rear surface of the control panel.

In an example, the part of the mounting pin can include a recessed portion, and the locking device can engage the recessed portion of the mounting pin to secure the mounting pin in the interior of the mounting box. The recessed portion can include a tapered surface, and the locking device can engage the tapered surface of the recessed portion such that movement of the locking device with respect to the tapered surface of the recessed portion draws the mounting pin in the direction of engagement of the mounting pin. In some examples, the locking device also can include a tapered portion engaging the tapered surface of the recessed portion.

In an example, the part of the mounting box can include a second opening configured to receive a portion of the locking device. The locking device can include a threaded portion engaging the second opening in the mounting box and a head configured to be rotated by a tool. For example, the locking device can include a set screw.

According to the exemplary features and embodiments, the present invention can provide a home cooking appliance comprising a housing, and the adjustable mounting system, wherein the mounting box is fixed to the housing, and wherein the movement of the locking device with respect to the mounting box adjusts a position of the control panel with respect to the housing. The mounting pin, the mounting box, and the locking device can be concealed from view when the control panel is mounted on the housing.

The home cooking appliance can include a second component mounted on the housing, wherein the second component has a surface that is adjacent to an edge of the control panel, and wherein the movement of the locking device with respect to the mounting box draws the edge of the control panel closer to an edge of the surface of the second component to reduce a gap between the edge of the control panel and the edge of the surface of the second component. For example, the second component can be a cooktop surface of the home cooking appliance, one or more sidewalls of the home cooking appliance, or another exterior component or surface of the appliance that adjacent to the control panel and visible to a user.

In an example, a sidewall of the appliance can include an opening (e.g., a discrete opening) adjacent to the locking device that provides access to the locking device for controlling the movement of the locking device with respect to the mounting box. For example, the locking device can include a threaded portion engaging the mounting box and a head configured to be rotated by a tool, and the opening of the sidewall can provide access for the tool to be inserted through the sidewall to the head of the locking device which is concealed from view by the sidewall and the control panel when the control panel is mounted on the housing.

The opening can be discretely located in the sidewall or side panel of the housing and not visible, or not easily visible, from a front of the appliance. In some examples, the opening can be concealed from view by adjacent cabinetry when the appliance is positioned between cabinetry of a kitchen. In this way, the appliance could be moved or shifted by a small amount (e.g., moved forward) to expose the discrete opening in the sidewall or side panel of the housing and thereby enabling a technician to insert a tool through the opening to actuate the locking device and release the mounting pin of the adjustable mounting system from the mounting box to remove the control panel from the housing.

The exemplary embodiments of the present invention can provide a control panel that can be simply and easily installed without any visible fasteners while also enabling the control panel to be one of the final components, or the final component, installed on the appliance during the manufacturing process, thereby improving the assembly process in the manufacturing facility, reducing or minimizing a risk of damage to the control panel during the assembly process, and improving access to the interior of the appliance for installation and assembly of various other components, assemblies, or systems of the appliance throughout the manufacturing process. The exemplary embodiments of the present invention also can provide a control panel that can be simply and easily removed from the housing of the appliance and re-installed on the appliance in the manufacturing facility or in the field, thereby simplifying and improving a process of servicing or repairing various components of the appliance, for example, during testing or certification of the appliance, or during servicing/repairing various components of the appliance throughout the lifespan of the appliance, etc.

By enabling the control panel to be one of the final components, or the final component, installed on the appliance during the manufacturing process, the interior of the appliance can remain accessible to installers on the assembly line throughout the manufacturing process. Particularly, an interior space within the appliance, which is configured to accommodate a plurality of components or sub-assemblies associated with the operation of the burners, such as gas components including gas supply lines, gas nozzles, Venturi tubes, mounting brackets, etc., mechanical and/or electrical components of an igniter system, gas valves for controlling a flow of gas to the respective burners, valve stems extending from the gas valves and configured to receive control knobs, etc., can be accessible to installers on the assembly line throughout the manufacturing process. In this way, various components and sub-assemblies may be easier to assemble and install within the interior of the appliance during the manufacturing process.

Additionally, such components and sub-assemblies may be easier to repair, disassemble, or re-install within the interior of the appliance during servicing or repair of the appliance. For example, according to the present invention, a service technician would no longer need to remove the cooktop or the maintop to gain access to the gas components or other components within the appliance and may no longer need to disassemble various components and sub-assemblies within the appliance to gain access to these or other components. As a result, the present invention may reduce service time, as well as wear on other components of the appliance, such as wear on jet holder screws that mount a jet holder cup to the bottom of the maintop of the appliance, etc. The present invention recognizes that limiting the disassembly of components is particularly important for safety critical components and their associated hardware and connections to other components.

The exemplary embodiments of the present invention can reduce tolerances in the assembly process by minimizing a number of interrelated parts and interfaces of components in the tolerance stack and providing an inexpensive adjustable mounting system having tight tolerances and a simple and clean interface between parts.

Furthermore, the exemplary embodiments of the present invention can provide a control panel that can be simply and easily adapted to a housing of a home cooking appliance with only minor changes to the structure of the housing to incorporate the components of a bracket, flange, or the like for receiving mount box, or to couple the mount box directly to an existing part of the housing of the appliance.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein.

DETAILED DESCRIPTION OF THE EXEMPLARY EMBODIMENTS OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to FIGS. 1-9, exemplary embodiments of an adjustable mounting system for mounting a control panel 30, without any visible fasteners, on a home cooking appliance 10 and a home cooking appliance 10 having an adjustable mounting system for mounting such a control panel 30, will now be described.

Figure 1:
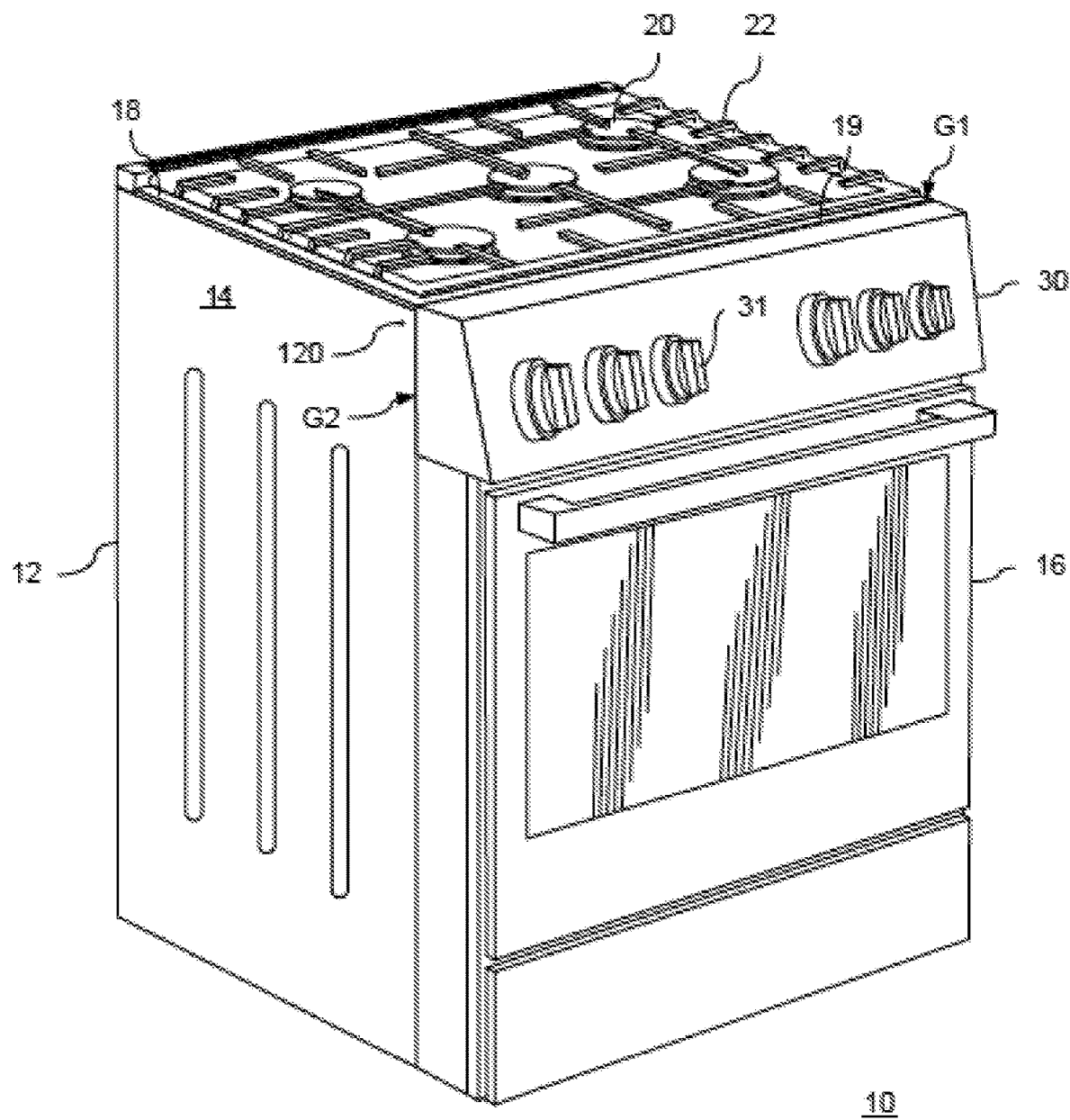
FIG. 1 is a perspective view of a home cooking appliance according to an exemplary embodiment of the invention.

As shown in FIG. 1, an example of a home cooking appliance 10 can include a housing 12 having a sidewall 14, a cooking compartment accessible via a door 16, a cooktop surface having a side edge 18 and a front edge 19, one or more burners 20 or other heating elements on the cooktop surface, and a cooking grate 22 for supporting cookware above the burners 20. The home cooking appliance 10 can include a control panel 30 having one or more user input devices 31, such as one or more control knobs, touch sensitive input devices, etc., for controlling operation of one or more gas or electric heating elements, such as the burners 20, circulating fans, etc. in the cooking compartment for performing a preheat operation, cooking operation, warming operation, etc.

In the illustrated example, the home cooking appliance 10 includes a freestanding range. In other examples, the home cooking appliance 10 can include, for example, other stand-alone appliances, wall mounted appliances, etc., such as a stand-alone oven, wall mounted oven, double oven, combination oven, countertop oven, microwave oven, air fryer, modular appliance unit, etc. having one or more gas or electric cooking or warming devices, such as an oven, steam oven, convection oven, and/or warming drawer and a control panel 30. One of ordinary skill will recognize that other configurations are possible. The home cooking appliance 10 can include a controller or control unit comprising, for example, a processor or computation unit, a memory unit, and an operating program which is stored in the memory unit and executed by the processor or computation unit. The control unit can be provided for controlling one or more cooking processes, controlling one or more operations or functions of various components of the appliance, among other things.

With reference again to the example of FIG. 1, the home cooking appliance 10 includes an adjustable mounting system for mounting a control panel 30 without visible fasteners, and more particularly, for mounting a control panel 30 without any fasteners being visible to a user from a front of the appliance 10. The adjustable mounting system can be configured to control or adjust (e.g., minimize or eliminate) a first gap G1 between a top surface or edge of the control panel 30 and a front surface or edge 19 of the cooktop and/or a second gap G2 between a side surface, sidewall, or rear edge thereof of the control panel 30 and a front surface or edge of the sidewall 14 of the housing 12 of appliance 10. In the example, the sidewall 14 of the housing 12 of appliance 10 can include an opening 120 (e.g., a discrete opening) for accessing a part of the adjustable mounting system to secure the control panel 30 to the housing 12 and/or to control or adjust (e.g., minimize or eliminate) the first gap G1 and/or second gap G2.

With reference to FIGS. 2-4D, examples of components of an adjustable mounting system for mounting the control panel 30 without visible fasteners will now be described.

Figure 2:
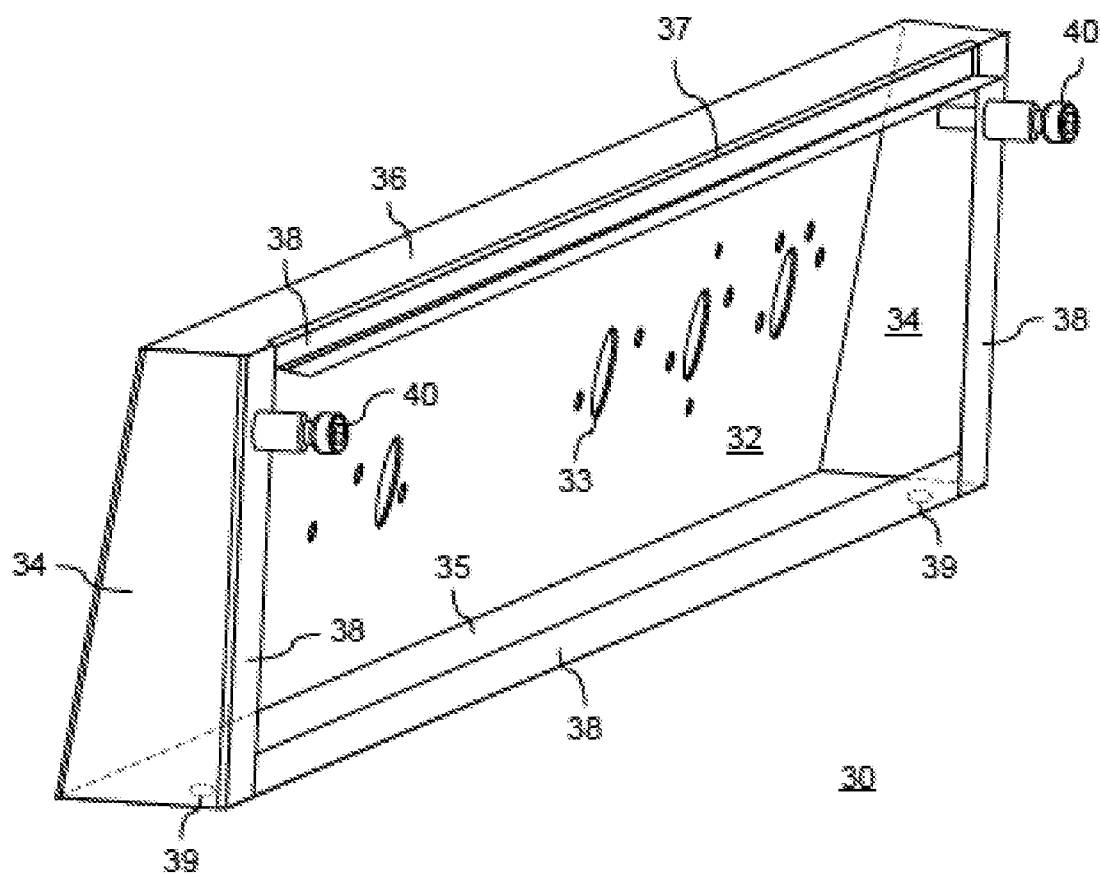
FIG. 2 is a rear perspective view of a control panel for a home cooking appliance according to an exemplary embodiment of the invention.

As shown in FIG. 2, an example of a control panel 30 can include a front face or panel 32 having a plurality of openings 33 for permitting a plurality of stems to extend from gas valves in the appliance 10 through the control panel 30 to the user input devices 31 (e.g., control knobs). The control panel 30 can include sidewalls 34, a top surface 36, a lower surface 35, and a rear surface 38. The top surface 36 can include a rear surface or rear edge 37 configured to abut or be disposed adjacent to a front surface or edge 19 of the cooktop or another component of the appliance 10. The sidewalls 34 can include a rear surface or edge configured to abut or be disposed adjacent to a front surface or edge of the sidewall 14 of the housing 12 of appliance 10 or another component of the appliance 10. As shown in FIG. 2, an example of a control panel 30 can include one or more mounting pins 40 extending rearward from the control panel 30, such as from one or more parts of the rear surface 38 of the control panel 30. As shown in the example, the control panel 30 can include a pair of mounting pins 40. In other examples, additional mounting pins 40 can be provided, such as four mounting pins, six mounting pins, etc. The mounting pins 40 can extend from an upper end of side regions of the rear surface 38 of the control panel 30. In other examples, the mounting pins 40 can additionally or alternatively extend from other parts or areas of the rear surface 38 of the control panel 30, such as from a lower end of side regions of the rear surface 38 of the control panel 30. In further examples, the mounting pins 40 can additionally or alternatively extend from other parts or areas of the control panel 30, such as from an interior surface of the front face or panel 32.

Figure 3A:
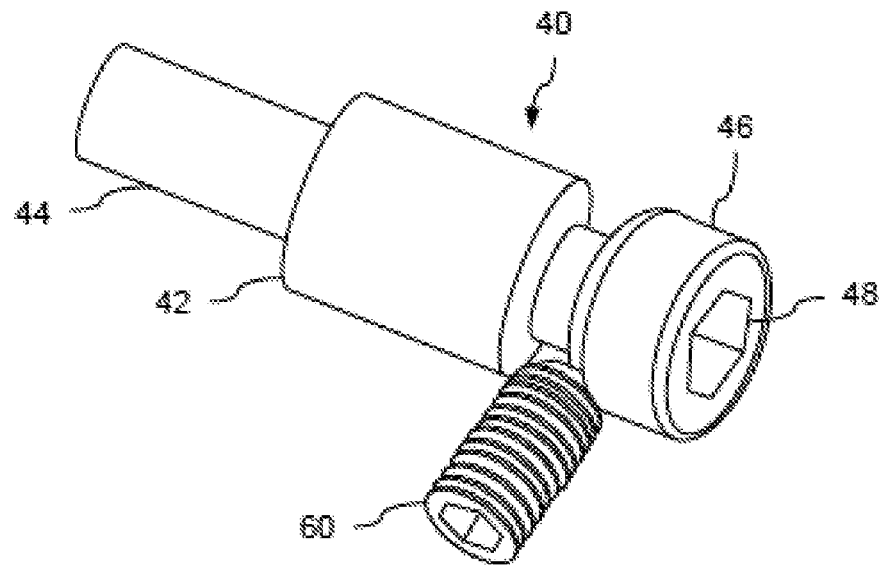
FIG. 3A is a perspective view of a mount pin of an adjustable mounting system for a home cooking appliance according to an exemplary embodiment of the invention.
Figure 3B:
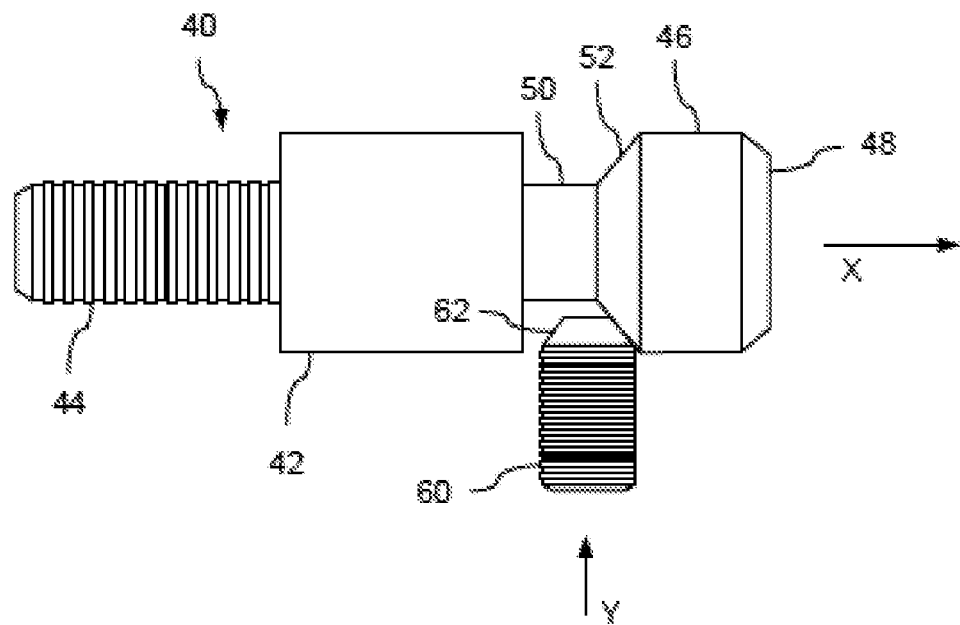
FIG. 3B is a side view of a mount pin of an adjustable mounting system for a home cooking appliance according to an exemplary embodiment of the invention.

With reference to FIGS. 3A-3B, an example of a mounting pin 40 can include a main body 42, such as a cylindrical body having a circular cross-sectional profile. In other examples, the mounting pin 40 can have other cross-sectional profiles, such as a square, rectangular, octagonal, star-shaped profile or other suitable profiles configured to facilitate engagement of the mounting pin 40 with the mounting box 70.

In an example, the mounting pin 40 can include a threaded portion 44 configured to be engaged with an opening in the rear surface 38 of the control panel 30. In other examples, the mounting pin 40 can be integrally formed with a part of the control panel 30 or fixed to a part of the control panel 30 by other means, such as by press fitting, welding, crimping, etc. or with a fastener, such as a nut, rivet, pin, etc. In some examples, the mounting pin 40 can include a head portion 46 having a suitable drive configuration, such as a slotted or Phillips drive, hex drive, Torx drive, Robertson drive, etc., configured to be rotated a tool to facilitate securing the mounting pin 40 in an opening of the control panel 30.

In an example, a part of the mounting pin 40, such as an end part between the main body 42 and a head portion 46, can include a recessed portion 50 configured to be engaged by a part of a locking device 60. In some examples, the recessed portion 50 can include a tapered surface 52 (e.g., a cam surface) configured to be engaged by a part of a locking device 60 (e.g., set pin or the like), when the locking device engages the recessed portion 50 of the mounting pin 40. As will be explained in greater detail below, in some examples, the mounting pin 40 and the locking device 60 can be arranged such that a movement of the locking device 60 in a direction Y, which is transverse to a axial length of the mounting pin 40, causes the mounting pin 40 to be moved or drawn in the direction of engagement X of the mounting pin 40 (e.g., in the axial direction of the mounting pin 40) by the engagement of the locking device with the tapered surface 52 of the recessed portion 50. In an example, a part of the locking device 60 can include a corresponding tapered surface 62 (e.g., corresponding cam surface) that engages the tapered surface 52 of the recessed portion 50.

Figure 4A:
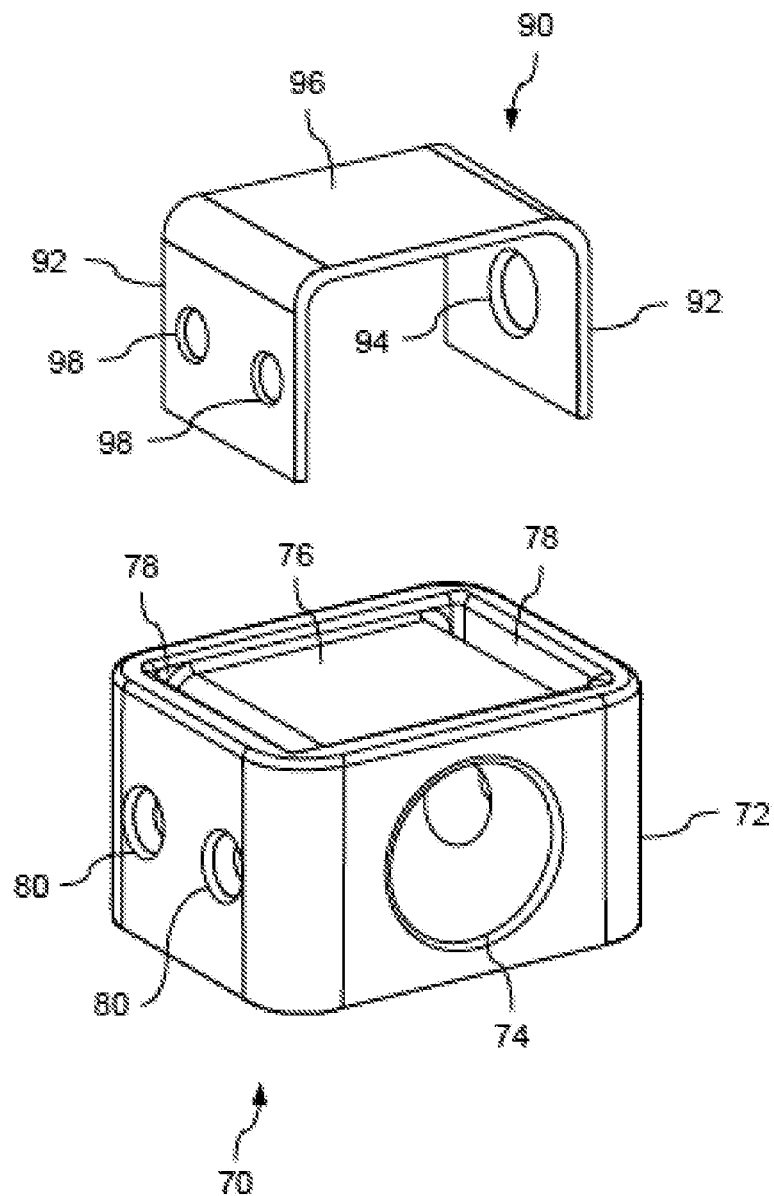
FIG. 4A is a perspective view of a mount box of an adjustable mounting system for a home cooking appliance according to an exemplary embodiment of the invention.
Figure 4B:
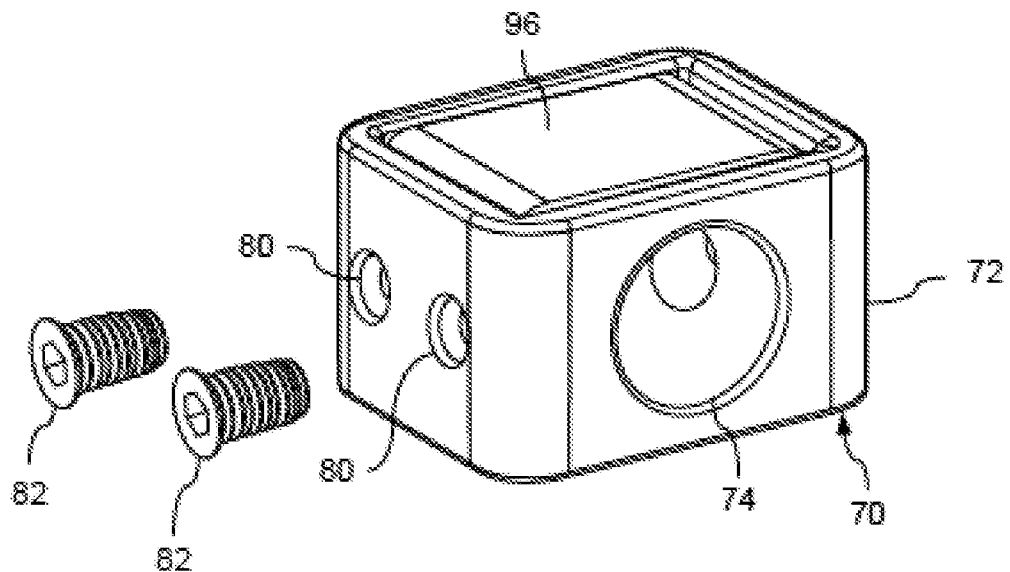
FIG. 4B is another perspective view of the mount box of FIG. 4A.
Figure 4C:
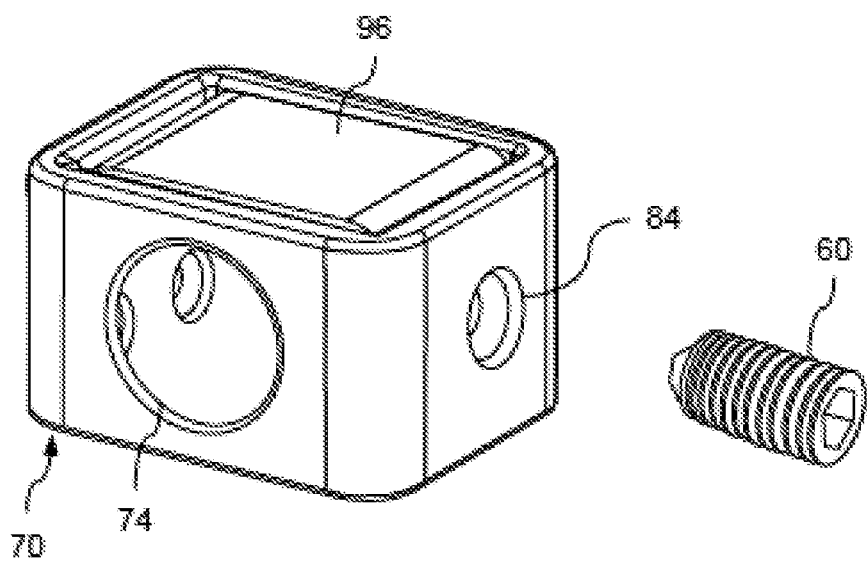
FIG. 4C is another perspective view of the mount box of FIG. 4A.

With reference to FIGS. 4A-4C, an example of a mounting box 70 configured to receive and secure a mounting pin 40 therein will now be described. The mounting box 70 can include a body 72 having an opening 74 configured to receive a mounting pin 40. In an example, a diameter of the opening 74 can correspond to a diameter of a portion of the mounting pin 40, such as a diameter of the head 46 and/or body 42. The opening 74 can include a circular opening configured to receive a mounting pin 40 having a cylindrical body with a circular cross-sectional profile. In other examples, the opening 74 can have other cross-sectional profiles, such as a square, rectangular, octagonal, star-shaped profile or other suitable profiles configured to facilitate engagement of the mounting pin 40 with the mounting box 70.

As shown in FIG. 4C, the body 72 also can include an opening 84 configured to receive a part of a locking device 60 (e.g., set pin or the like). In an example, a diameter of the opening 84 can correspond to a diameter of a part of the locking device 60.

The mounting box 70 can be configured to be mounted or coupled to a part of the home cooking appliance 10, such as a part of the housing 12. In an example, a bracket, flange, or the like, such as a U-shaped bracket 90, can be provided on a part of the home cooking appliance 10 to secure the mounting box 70 thereto. The bracket 90 can include an upper plate 96 and one or more legs 92. The upper plate 96 can be coupled to a part of the appliance 10 or integrally formed with a part of the appliance 10.

The mounting box 70 can be configured to be mounted or coupled to the home cooking appliance 10 by securing the mounting box 70 to the bracket 90. In the illustrated example, the mounting box 70 can include one or more slots 78 configured to receive the legs 92 of the bracket 90 therein as the mounting box 70 is moved into engagement with the bracket 90. The mounting box 70 can include a recessed surface 76 configured to accommodate the upper plate 96 and of the bracket 90 such that the bracket 90 is nested in the mounting box 70 when in an engaged state. The mounting box 70 can include one or more openings 80 and the bracket 90 can include one or more corresponding openings 98 such that the mounting box 70 can be secured to the bracket 90, for example, using one or more fixation elements, such as screws 82. In the example, the bracket 90 can include an opening 92 corresponding to the opening 84 in the mounting box 70 such that the locking device 60 can extend through the mounting box 70 and bracket 90 to engage a mounting pin 40 disposed within the mounting box 70.

Figure 5A:
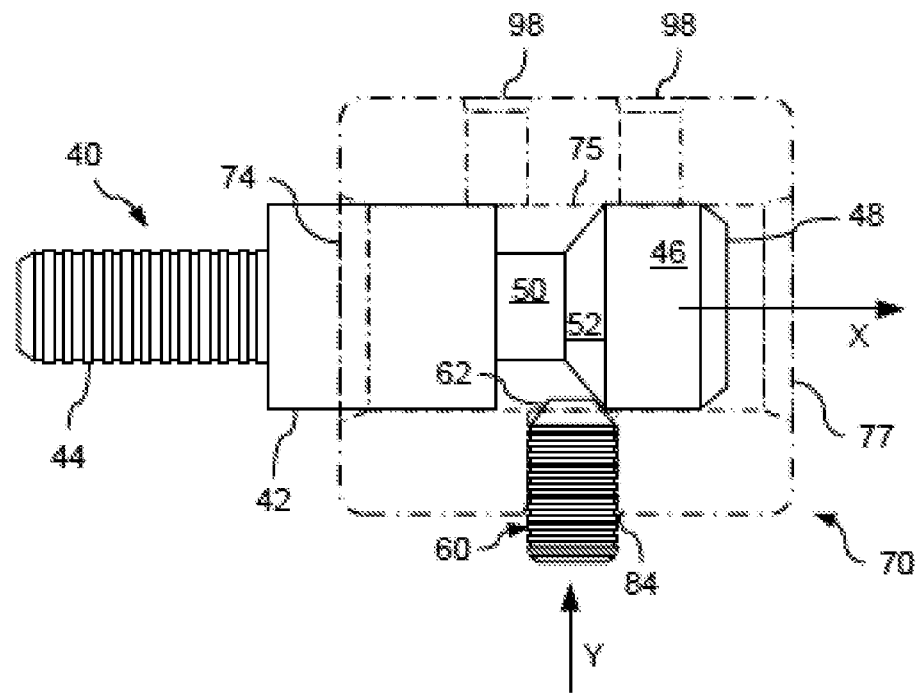
FIGS. 5A and 5B are plan views of an adjustable mounting system for a home cooking appliance according to an exemplary embodiment of the invention.
Figure 5B:
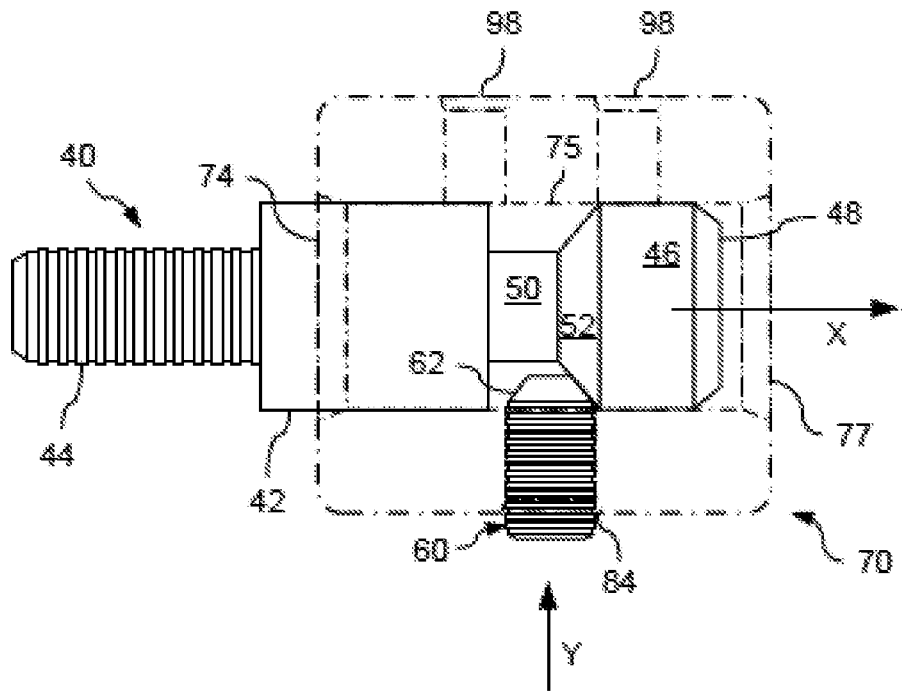

FIGS. 5A and 5B show an example of an adjustable mounting system having a mounting pin 40, a mounting box 70, and a locking device 60 in an assembled state. The mounting box 70 is illustrated using dashed lines such that the interaction of the mounting pin 40 and the locking device 60 therein are visible.

In this example, a part of the mounting pin 40, such as the threaded end 44, can be fixed to the control panel 30, and particularly, to the rear surface 38 of the control panel 30, such that the control panel 30 and mounting pin 40 are moveable together. The mounting box 70 can be fixed to the appliance 10 (for example, by screws 82 inserted through openings 98) in both the X and Y directions. The locking device 60 can be fixed in the X direction by the opening 84 of the mounting box 70 and movable in the Y direction as the locking device 60 is threaded in (or out) of the opening 84.

In operation, a part of the mounting pin 40, such as the head portion 46, can be inserted into the opening 74 of the mounting box 70 in the direction of insertion X until the end part between the main body 42 and a head portion 46, which includes the recessed portion 50 is disposed in an interior void, cavity, or tunnel 75 of the mounting box 70. As shown in FIG. 5A, a part of the locking device 60 can be inserted into the opening 84 of the mounting box 70 in the direction Y until the locking device 60 engages the recessed portion 50 of the mounting pin 40, and more particularly, until the tapered end 62 of the locking device 60 engages the tapered portion 52 of the mounting pin 40. As shown in FIG. 5B, as the locking device 60 is moved (e.g., threaded into opening 84) in the Y direction, the locking device 60 can slidingly engage the tapered portion 52 of the mounting pin 40, thereby causing the mounting pin 40 to be moved or drawn in the direction of engagement X of the mounting pin 40 (e.g., in the axial direction of the mounting pin 40) by the engagement of the locking device 60 with the tapered surface 52 of the recessed portion 50. In the illustrated example, the locking device 60 can include a corresponding tapered surface 62 (e.g., corresponding cam surface) that engages the tapered surface 52 of the recessed portion 50. The tapered surface 62 can be configured to have a corresponding angle to an angle of the tapered surface 52. In other examples, the tapered surfaces 52, 62 can be configured to have different angles or slopes from each other. In some examples, one or more tapered surfaces 52 and/or 62 can include a planar tapered surface, as shown, or a curved surface.

With reference to FIGS. 6-9, an example of a home cooking appliance 10 having an adjustable mounting system having a mounting pin 40, a mounting box 70, and a locking device 60 will now be described.

Figure 6:
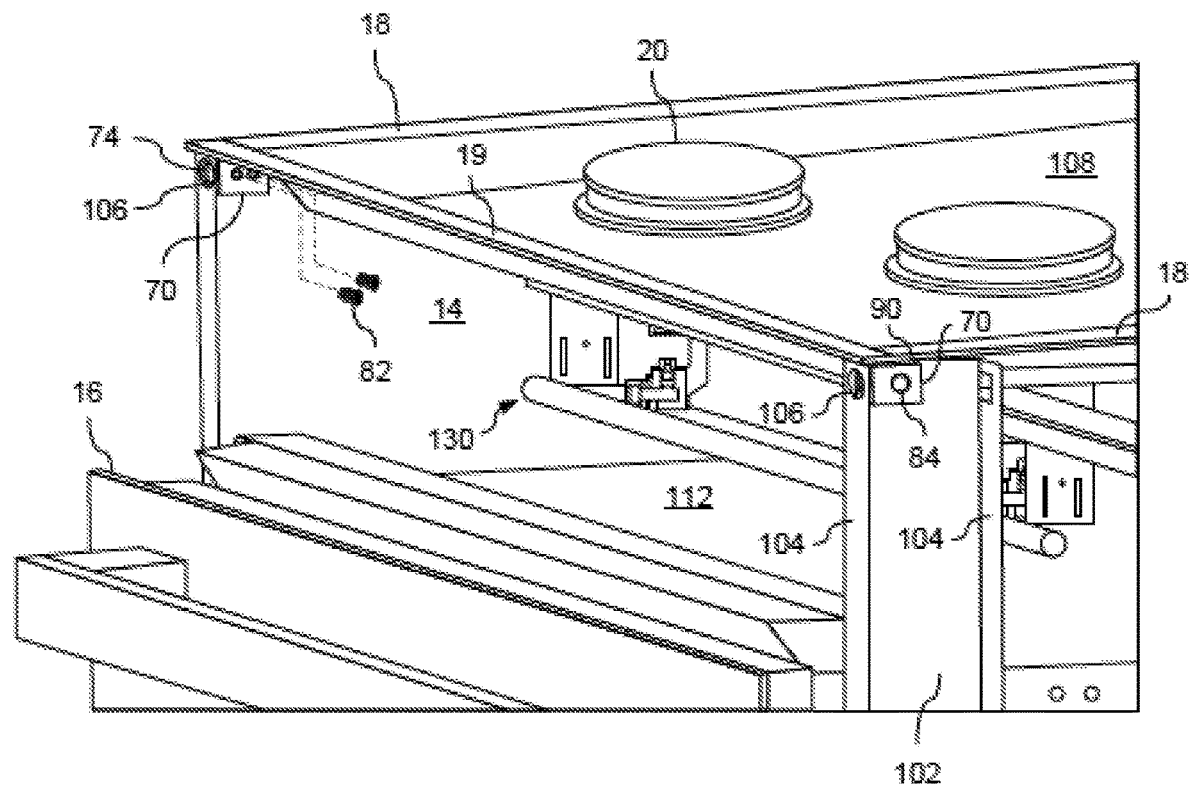
FIG. 6 is a partial perspective view of an adjustable mounting system for a home cooking appliance according to an exemplary embodiment of the invention.
Figure 7:
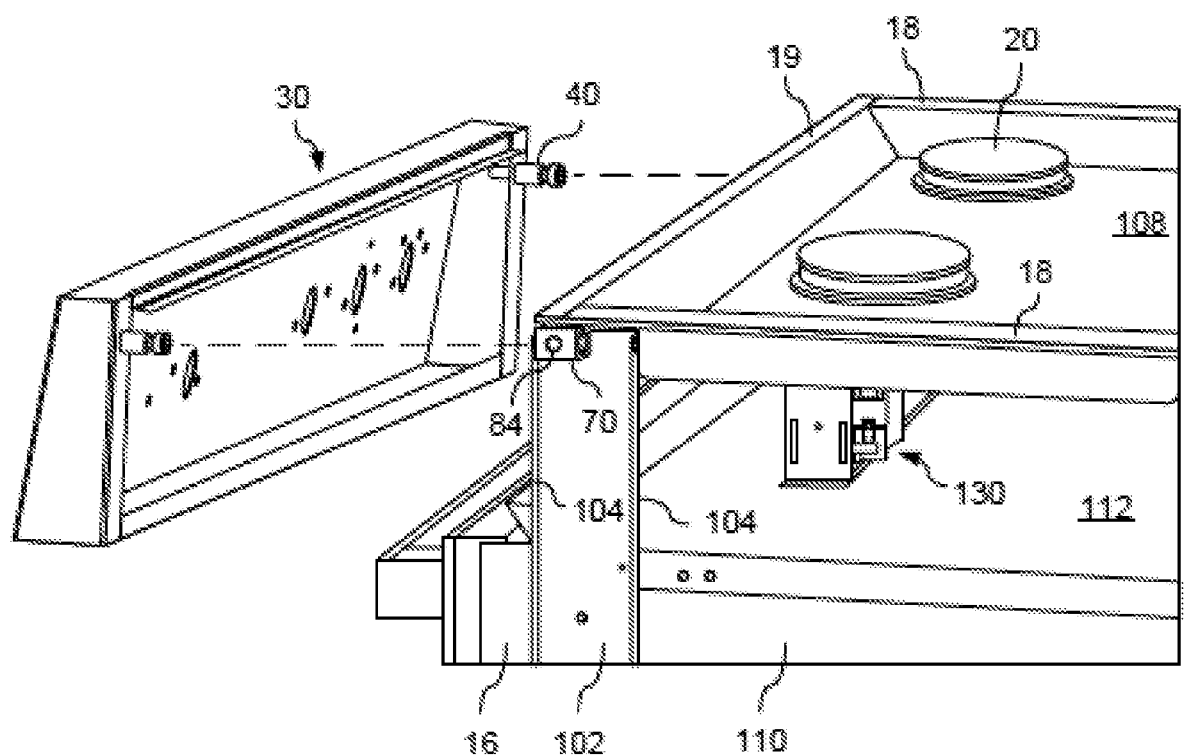
FIG. 7 is another partial perspective view of an adjustable mounting system for a home cooking appliance according to an exemplary embodiment of the invention.
Figure 8:
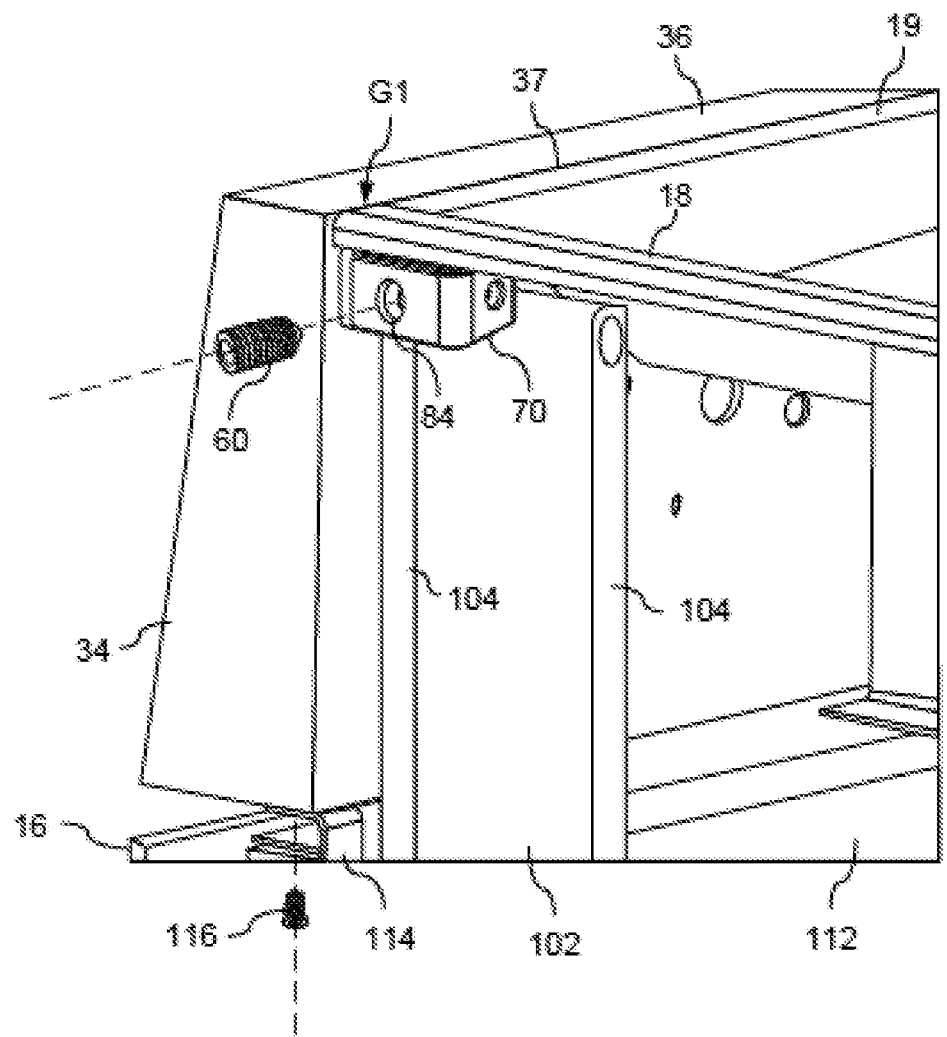
FIG. 8 is a partial, rear perspective view of an adjustable mounting system for a home cooking appliance according to an exemplary embodiment of the invention.
Figure 9:
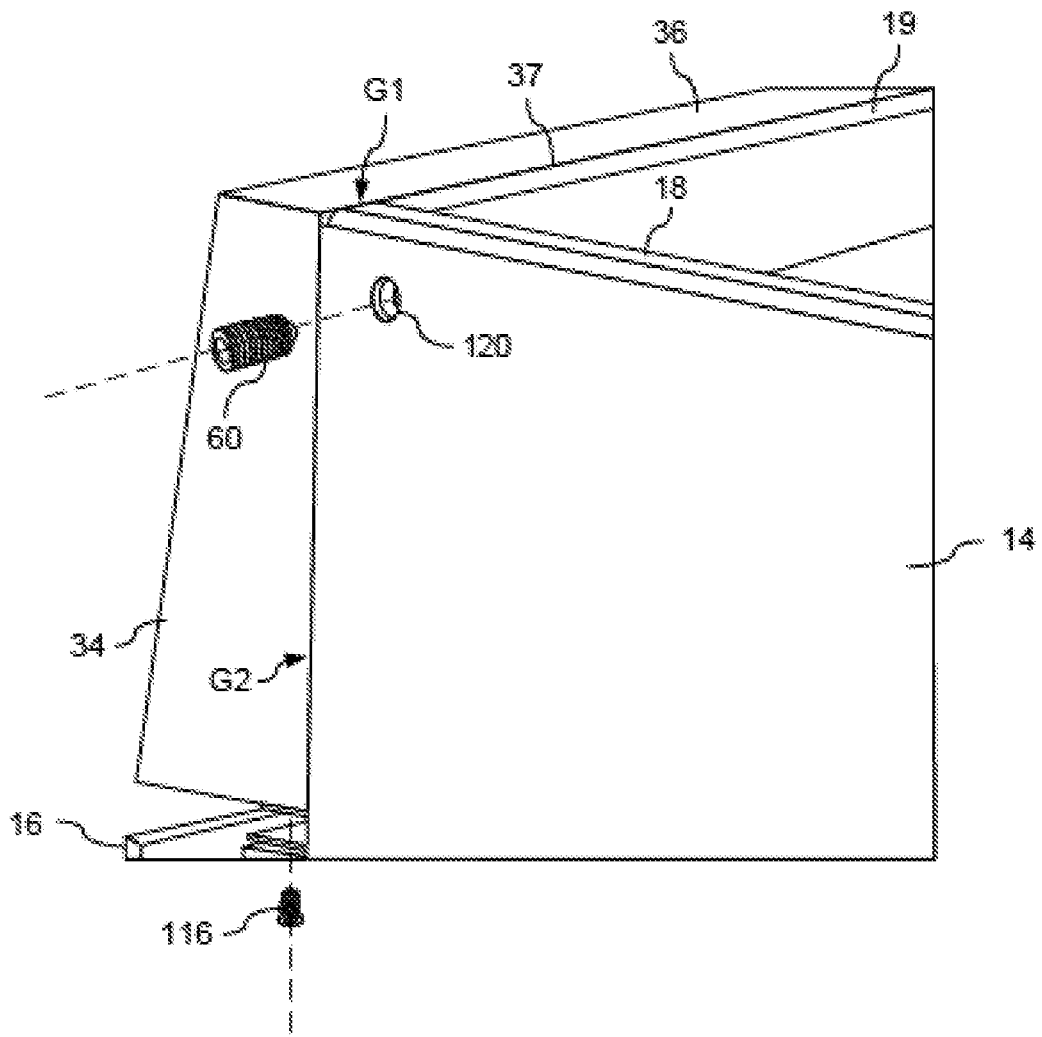
FIG. 9 is another partial, rear perspective view of an adjustable mounting system for a home cooking appliance according to an exemplary embodiment of the invention.

By way of example, FIGS. 6-9 show a partial view of a home cooking appliance 10 having a plurality of burners 20 disposed on a cooktop 108. In FIGS. 6-8, the sidewall 14 is removed for purposes of describing the components of the adjustable mounting system. FIG. 9 shows the appliance 10 with the sidewall 14. In this example, the appliance 10 can include a partition 112 (e.g., maintop) separating an upper portion of the appliance 10 from a cooking compartment 110 accessible by the door 16. The cooktop 108 and partition 112 can define a space configured to accommodate a plurality of components associated with the operation of the burners 20, such as gas components 130 including a gas supply line, gas nozzle, Venturi tube, mounting brackets, etc. For illustrative purposes, the gas components 130 are only generally and schematically illustrated. Other components of the appliance 10 can be accommodated in this area, such as mechanical and/or electrical components of an igniter system, gas valves for controlling a flow of gas to the respective burners, valve stems extending from the gas valves and configured to receive control knobs 31 when the control panel 30 is mounted to the appliance 10, etc.

As shown in the example, the control panel 30 can include a pair of mounting pins 40 configured to engage a corresponding pair of mounting boxes 70 on the appliance 10. In other examples, additional mounting pin 40 and mounting box 70 can be provided, such as four mounting pins, six mounting pins, etc. The mounting pins 40 can extend from an upper end of side regions of the rear surface 38 of the control panel 30. In other examples, the mounting pins 40 can additionally or alternatively extend from other parts or areas of the rear surface 38 of the control panel 30, such as from a lower end of side regions of the rear surface 38 of the control panel 30.

In the examples, each mounting box 70 can be secured to a bracket 90 provided on a part of the home cooking appliance 10, such as on an underside of a side edge 18 and/or front edge 19 of the cooktop surface 108, a frame structure 102, etc. To provide access to one or more of the openings 74, 84 of the mounting box 70, one or more openings can be provided in parts of the appliance 10. For example, a flange 104 of the frame structure 102 can include an opening 106 to permit access to the opening 74 of the mounting box 70 from a front of the appliance 10.

As shown in FIG. 6, with the control panel 30 removed, the various components, such as gas components 130, in the space defined between the cooktop 108 and partition 112 can be easily accessible, for example, during assembly of the appliance 10 or service of the appliance 10.

As shown in FIG. 7, during assembly, the control panel 30 having mounting pins 40 can be moved into position on the front of the appliance. The mounting pins 40 can be aligned with the openings 74 of the mounting boxes 70 such that the head portions 46 can be inserted into the openings 74 of the mounting boxes 70. As shown in FIG. 8, the mounting pins 40 can be inserted by a sufficient amount into the openings 74 such that the upper surface 36 of the control panel 30 is adjacent to the front edge 19 of the cooktop 108. A part of the locking device 60 can be inserted into through the opening 120 (e.g., discrete opening in FIG. 9) in the sidewall 14 and into the opening 84 of the mounting box 70 until the locking device 60 engages the recessed portion 50 of the mounting pin 40, and more particularly, until the tapered end 62 of the locking device 60 engages the tapered portion 52 of the mounting pin 40. As the locking device 60 is threaded into the opening 84, the locking device 60 can slidingly engage the tapered portion 52 of the mounting pin 40, thereby causing the mounting pin 40 to be drawn further into the interior of the mounting box 70, which thereby draws the control panel 30 closer to the housing of the appliance and can close (e.g., minimize or eliminate) a first gap G1 between the rear edge 37 of the upper surface 36 of the control panel 30 and the front edge 19 of the cooktop 108. The locking device 60 also can close (e.g., minimize or eliminate) a second gap G2 between a side surface, sidewall, or rear edge thereof of the control panel 30 and a front surface or edge of the sidewall 14 of the housing 12 of appliance 10.

In some examples, the appliance 10 can include one or more lower brackets 114 disposed below the control panel 30, as shown in FIGS. 8 and 9. The control panel 30 correspondingly can include one or more openings 39 in a lower surface 35 (see FIG. 2). In this way, the lower side of the control panel 30 can be secured in place by inserting one or more fixation elements, such as screws 116, through openings in the lower brackets 114 into the openings 39 of the control panel 30.

As shown in FIG. 9, the components of the adjustable mounting system can be concealed from view when the control panel 30 is mounted on the housing 12, particularly from a front of the appliance 10. For example, during assembly or mounting of the control panel 30 on the appliance 10, or disassembly of the control panel 30 from the appliance 10, the locking device 60 can be accessible (e.g., using a tool) through the opening 120, which can be discretely located in the side panel 14 of the housing 12 and not visible, or not easily visible, from a front of the appliance. In some examples, the opening 120 can be concealed from view by adjacent cabinetry when the appliance 10 is positioned between cabinetry of a kitchen. In the case of a repair or maintenance service being performed in the field, the appliance 10 could be moved or shifted by a small amount (e.g., moved forward) to expose the discrete opening 120 in the sidewall or side panel 14 of the housing to enable a service technician to insert a tool through the opening 120 to actuate the locking device 60, thereby releasing the mounting pin 40 of the adjustable mounting system from the mounting box 70 and enabling the control panel 30 to be easily removed from the housing of the appliance 10 to provide access to other components in the interior of the appliance 10. Upon completion of such a repair or maintenance service, the control panel 30 can be simply and easily re-installed using the adjustable mounting system and any gaps (e.g., first gap G1, second gap G2) can be eliminated by actuating the locking device 60 using a tool inserted through the discrete opening 120 in the sidewall or side panel 14 of the housing. The appliance 10 could then be moved or shifted by a small amount (e.g., moved rearward) to conceal the discrete opening 120 in the sidewall or side panel 14 of the housing from view by adjacent cabinetry when the appliance 10 is positioned between cabinetry of a kitchen.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

What is claimed is:

1. An adjustable mounting system for mounting a control panel on a housing of a home cooking appliance, the adjustable mounting system comprising:
   the control panel having a mounting pin extending from a rear surface of the control panel, the mounting pin including a recessed portion having a tapered surface;
   a mounting box configured to be fixed on the housing, the mounting box including a first opening configured to receive a part of the mounting pin into an interior of the mounting box; and
   a locking device configured to engage the tapered surface of the recessed portion of the mounting pin and a part of the mounting box and secure the mounting pin in the interior of the mounting box, thereby securing the control panel to the housing, wherein a movement of the locking device with respect to the mounting box adjusts a position of the control panel with respect to the housing, and movement of the locking device with respect to the tapered surface of the recessed portion draws the mounting pin in a direction of engagement of the mounting pin.

2. The adjustable mounting system of claim 1, wherein the mounting pin, the mounting box, and the locking device are concealed from view when the control panel is mounted on the housing.

3. The adjustable mounting system of claim 1, wherein the movement of the locking device with respect to the mounting box draws the mounting pin in the direction of engagement of the mounting pin with respect to the mounting box to adjust the position of the mounting pin with respect to the mounting box.

4. The adjustable mounting system of claim 1, wherein the rear surface of the control panel includes an opening, and wherein the mounting pin includes a threaded portion engaging the opening of the control panel.

5. The adjustable mounting system of claim 1, wherein the mounting pin is integrally formed on the rear surface of the control panel.

6. The adjustable mounting system of claim 1 wherein the locking device includes a tapered portion engaging the tapered surface of the recessed portion.

7. The adjustable mounting system of claim 1, wherein the part of the mounting box includes a second opening configured to receive a portion of the locking device.

8. The adjustable mounting system of claim 7, wherein the locking device includes a threaded portion engaging the second opening in the mounting box and a head configured to be rotated by a tool.

9. The adjustable mounting system of claim 8, wherein the locking device includes a set screw.

10. A home cooking appliance comprising:
a housing; and
the adjustable mounting system of claim 1,
wherein the mounting box is fixed to the housing, and wherein the movement of the locking device with respect to the mounting box adjusts a position of the control panel with respect to the housing.

11. The home cooking appliance of claim 10, wherein the mounting pin, the mounting box, and the locking device are concealed from view when the control panel is mounted on the housing.

12. The home cooking appliance of claim 10, further comprising:
a second component mounted on the housing,
wherein the second component has a surface that is adjacent to an edge of the control panel, and
wherein the movement of the locking device with respect to the mounting box draws the edge of the control panel closer to an edge of the surface of the second component to reduce a gap between the edge of the control panel and the edge of the surface of the second component.

13. The home cooking appliance of claim 12, wherein the second component is a cooktop surface of the home cooking appliance.

14. The home cooking appliance of claim 12, wherein the second component is a sidewall of the home cooking appliance.

15. The home cooking appliance of claim 10, further comprising:
a sidewall mounted on the housing,
wherein the sidewall includes an opening adjacent to the locking device and providing access to the locking device for controlling the movement of the locking device with respect to the mounting box.

16. The home cooking appliance of claim 15, wherein the locking device includes a threaded portion engaging the mounting box and a head configured to be rotated by a tool, and wherein the opening of the sidewall provides access for the tool to be inserted through the sidewall to the head of the locking device which is concealed from view by the sidewall and the control panel when the control panel is mounted on the housing.

* * * * *